(12) United States Patent
Chua et al.

(10) Patent No.: US 6,633,692 B2
(45) Date of Patent: Oct. 14, 2003

(54) HIGH CARRIER INJECTION OPTICAL WAVEGUIDE SWITCH

(75) Inventors: Soo Jin Chua, Singapore (SG); BaoJun Li, Singapore (SG)

(73) Assignee: The National University of Singapore, Singapore (SG)

( * ) Notice: Subject to any disclaimer, the term of this patent is extended or adjusted under 35 U.S.C. 154(b) by 0 days.

(21) Appl. No.: 09/917,928

(22) Filed: Jul. 31, 2001

(65) Prior Publication Data

US 2003/0026523 A1 Feb. 6, 2003

(51) Int. Cl.[7] .................................................. G02B 6/26
(52) U.S. Cl. ............................. 385/16; 385/40; 385/129
(58) Field of Search ................................ 385/5, 15, 16, 385/17, 42, 45, 122, 14, 129, 130, 131, 40

(56) References Cited

U.S. PATENT DOCUMENTS

| | | | | |
|---|---|---|---|---|
| 5,185,830 A | * | 2/1993 | Nishimoto | 385/41 |
| 5,369,718 A | | 11/1994 | Kamata et al. | 385/21 |
| 5,878,181 A | | 3/1999 | Van Der Tol | 385/122 |

OTHER PUBLICATIONS

Ito, et al., "A Carrier Injection Type Optical Switch in GaAs Using Free Carrier Plasma Dispersion with Wavelength Range from 1.06 to 1.55 μm" IEEE Journal of Quantum Electronics, vol. 25, No. 7, Jul. 1989.

Ito, et al., "Carrier–injection–type optical switch in GaAs with a 1.06–1.55 μm wavelength range", Appl. Phys. Lett, 54 (2), Jan. 9, 1989.

Janz, et al., "mach–Zehnder Switch Using an Ultra–Compact Directional Coupler in a Strongly–Confining Rib Structure", IEEE Photonics Technology Letters, vol. 6, No. 8, Aug, 1994.

Gao, et al., "SiGe/Si bifurcation optical active switch based on plasma dispersion effect", Electronics Letters, Sep. 28, 1995, vol. 31, No. 20.

Zhao, et al., "Zero–gap directional coupler switch integrated into a silicon–on insulator for 1.3–μm operation", Optica Letters, vol. 21, No. 20, Oct. 15, 1996.

* cited by examiner

Primary Examiner—Loha Ben
Assistant Examiner—M. Hasan
(74) Attorney, Agent, or Firm—Birch, Stewart, Kolasch & Birch, LLP

(57) ABSTRACT

Based on the two-mode interference principle and the free-carrier plasma dispersion effect, a high carrier injection optical waveguide includes: a pair of optical waveguide elements, one functioning as an optical waveguide input and the other functioning as an optical waveguide output; a two-mode interference (TMI) region, made of semiconductor material, between the optical waveguide input and the optical waveguide output; first and second carrier injection regions; and a lateral carrier collection region, the lateral carrier collection region and the first carrier injection region being positioned on opposite sides of the TMI region with the second carrier injection region being positioned between the lateral carrier collection region and the first carrier injection region.

32 Claims, 8 Drawing Sheets

HIGH CARRIER INJECTION OPTICAL WAVEGUIDE SWITCH

BACKGROUND OF THE INVENTION

1. Field of the Invention

The present invention relates to semiconductor optical waveguide switches and, more particularly, to high carrier injection optical waveguide switches.

2. Background Information

The two-mode interference (TMI) optical waveguide switch is one of the most important guided-wave devices in integrated optics. Several methods have been proposed for realizing such TMI optical waveguide switches, such methods being described for example in: Janz et al. "Mach-Zehnder switch using an ultra-compact directional coupler in a strongly-confining rib structure," IEEE Photon. Technol. Lett. Vol. 6, pp. 981–983, 1994; Gao et al. "SiGe/Si bifurcation optical active switch based on plasma dispersion effect," Electron. Lett. Vol. 31, pp. 1740–1741, 1995; and Zhao et al. "Zero-gap directional coupler switch integrated into a silicon-on insulator for 1.3-$\mu$m operation," Opt. Lett. Vol. 21, pp. 1664–1665, 1996. However, the optical waveguide switches described in these publications have only a single carrier injection region, resulting in a large injection current and injection current density when the optical waveguide switch is in operation.

According to conventional types of carrier injection, optical waveguide switches can be classified as either vertical injection or lateral injection. For a vertical injection type optical waveguide switch, one electrode is located on the top of the switch, the other electrode is located at the bottom of substrate, and the substrate must be $n^+$ or $p^+$ type for good ohmic contact. For either $n^+$ type or $p^+$ type substrate, a large amount of free carriers will be present at the interface between the substrate and the waveguide layer. Hence, carrier absorption loss will be very large at the interface when the switch is in operation. However, the injection current and injection current density cannot be reduced by any other means. With lateral injection, the carrier absorption loss at the interface between the substrate and the waveguide layer can be eliminated due to the avoidance of either $n^+$ or $p^+$ substrate. However the injection current and injection current density still cannot be reduced.

FIG. 1 is a schematic plan view showing a conventional example of the lateral injection TMI optical waveguide switch. In FIG. 1, two optical waveguides, 1 and 2, cross at an angle $\theta$ to form a Y-branch and function as the inputs of the switch, while optical waveguides, 3 and 4, cross at an angle $\theta$ to form another Y-branch and function as the outputs of the switch. Waveguide 5 is a TMI section and serves as a refractive index modulation region. Reference numbers 6 and 7 refer to the carrier injection region and carrier collection region, respectively.

FIG. 2 shows a sectional structure view of the optical waveguides 1, 2, 3 and 4, which is taken along line I—I of FIG. 1. In the structure of FIG. 2, reference number 8 is a substrate, 9 is a buffer layer, and 10 is a core waveguide layer. The rib-shaped optical waveguide is formed by reactive ion etching. The whole structure is covered by an insulating film 11. The buffer layer 9 is used to avoid scattering loss due to impurities and the absorption loss of carriers which are located at the surface of the substrate.

FIG. 3 is a sectional structure view of the middle section of the optical waveguide switch, which is taken along the line II—II of FIG. 1. In the structure, reference numbers 8, 9, 10 and 11 refer to the same elements as in FIG. 2. The rib-shaped optical waveguide is formed by reactive ion etching. Two ion implantation regions 12 and 14 are formed in the upper layer 10. An insulating film 11 of $SiO_2$ and two metal electrodes 13 and 15 are evaporated and formed.

In the above-described lateral structures, the substrate used can be lightly n or p doped, and the carrier absorption loss from the use of $n^+$ or $p^+$ substrate can be avoided. However, in order to achieve the switching from the output port 4 to 3, a large applied bias voltage, i.e., a large injection current, is still required.

SUMMARY OF THE INVENTION

An object of the invention is to provide a high carrier injection optical waveguide switch capable of reducing the switching injection current and injection current density at the time of switching. It is a further object of the present invention to provide a high carrier injection optical waveguide that, in addition to low power consumption, has low optical loss.

These and other objects of the invention are achieved by providing a higher carrier injection optical waveguide that includes: a pair of optical waveguide elements, one functioning as an optical waveguide input and the other functioning as an optical waveguide output; a TMI region, made of semiconductor material, between the optical waveguide input and the optical waveguide output; first and second carrier injection regions; and a lateral carrier collection region, the lateral carrier collection region and the first carrier injection region being positioned on opposite sides of the TMI region with the second carrier injection region being positioned between the lateral carrier collection region and the first carrier injection region. According to one implementation of the present invention, the input and output optical waveguides are each configured as a Y-branch connection of two single-mode rib waveguides. These single-mode waveguides include a waveguide layer on a substrate with a buffer layer. The width of the single-mode waveguides is w. The TMI region includes a waveguide layer on a substrate with a buffer layer. The width of the TMI region of the switch is 2 times that of the single-mode waveguide. On the top surface of the TMI region and beside the TMI region, two carrier injection junctions are made to inject the carriers into the refractive index modulation region, i.e., the TMI region, when they are forward biased.

In one implementation of the present invention, the high carrier injection optical waveguide switch is fabricated using Si-based SiGe material and standard Si technology. Thus, the present invention provides a high carrier optical waveguide switch that is simple to fabricate and easy to operate. Hence, the present invention is very suitable for silicon-based monolithic and hybrid optoelectronic integration.

BRIEF DESCRIPTION OF THE DRAWINGS

The present invention will be more fully understood from the detailed description given below by reference to the accompanying drawings. The drawings are provided for the purpose of illustration only, and thus should not limit the scope of the present invention. In the drawings.

DETAILED DESCRIPTION OF THE INVENTION

Figure 1:
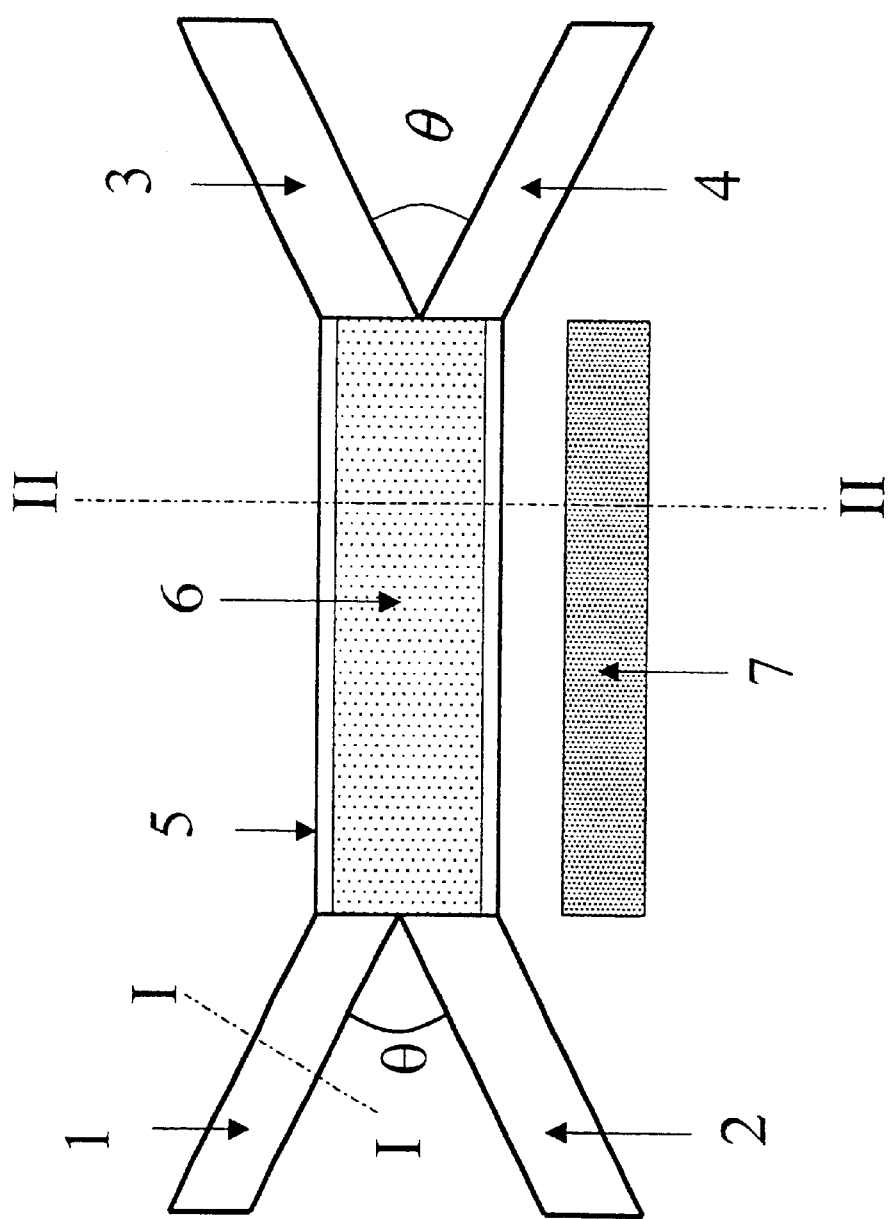
FIG. 1 is a schematic plan view showing a conventional lateral injection optical waveguide switch based on a TMI coupling structure.
Figure 2:
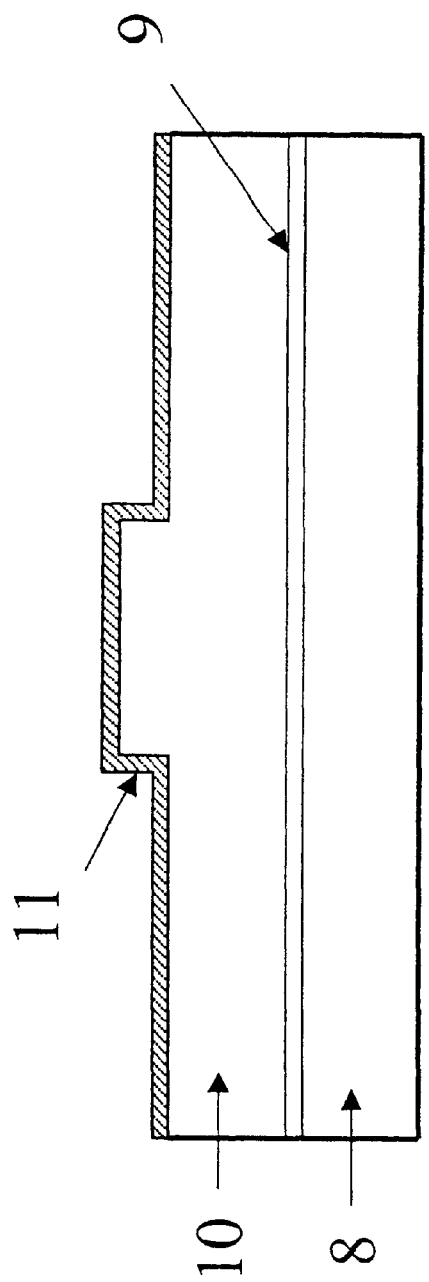
FIG. 2 is a sectional view taken along line I—I of FIG. 1.
Figure 3:
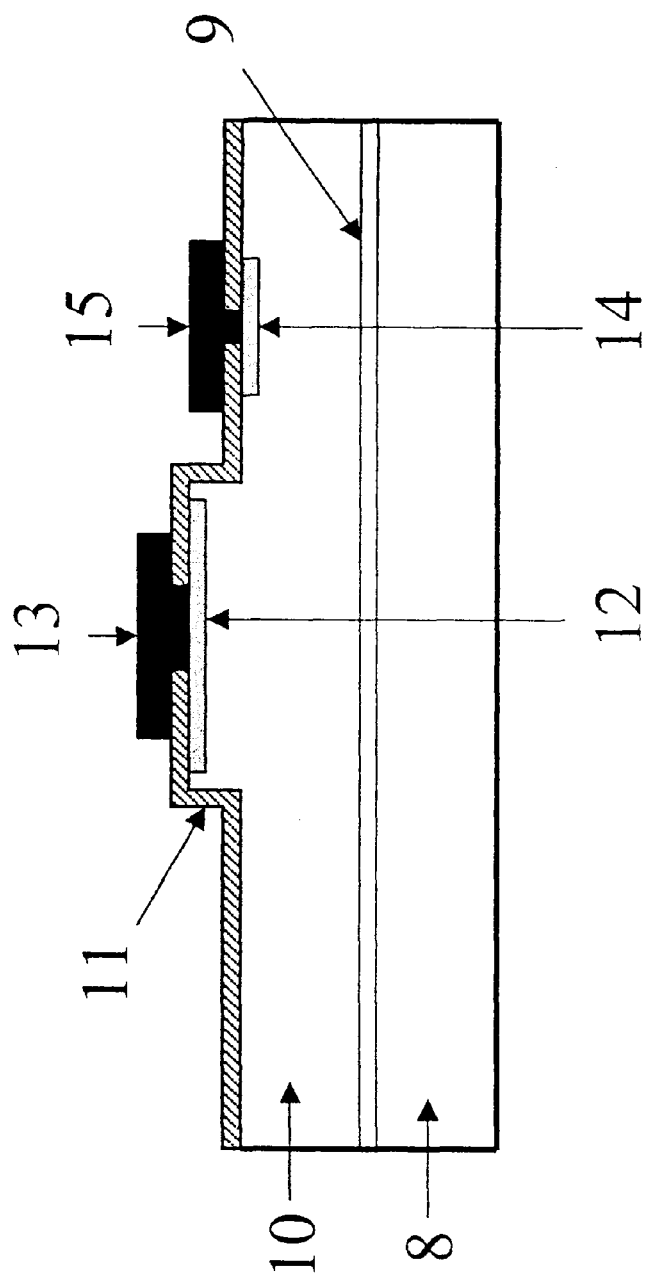
FIG. 3 is a sectional view taken along line II—II of FIG. 1.
Figure 4:
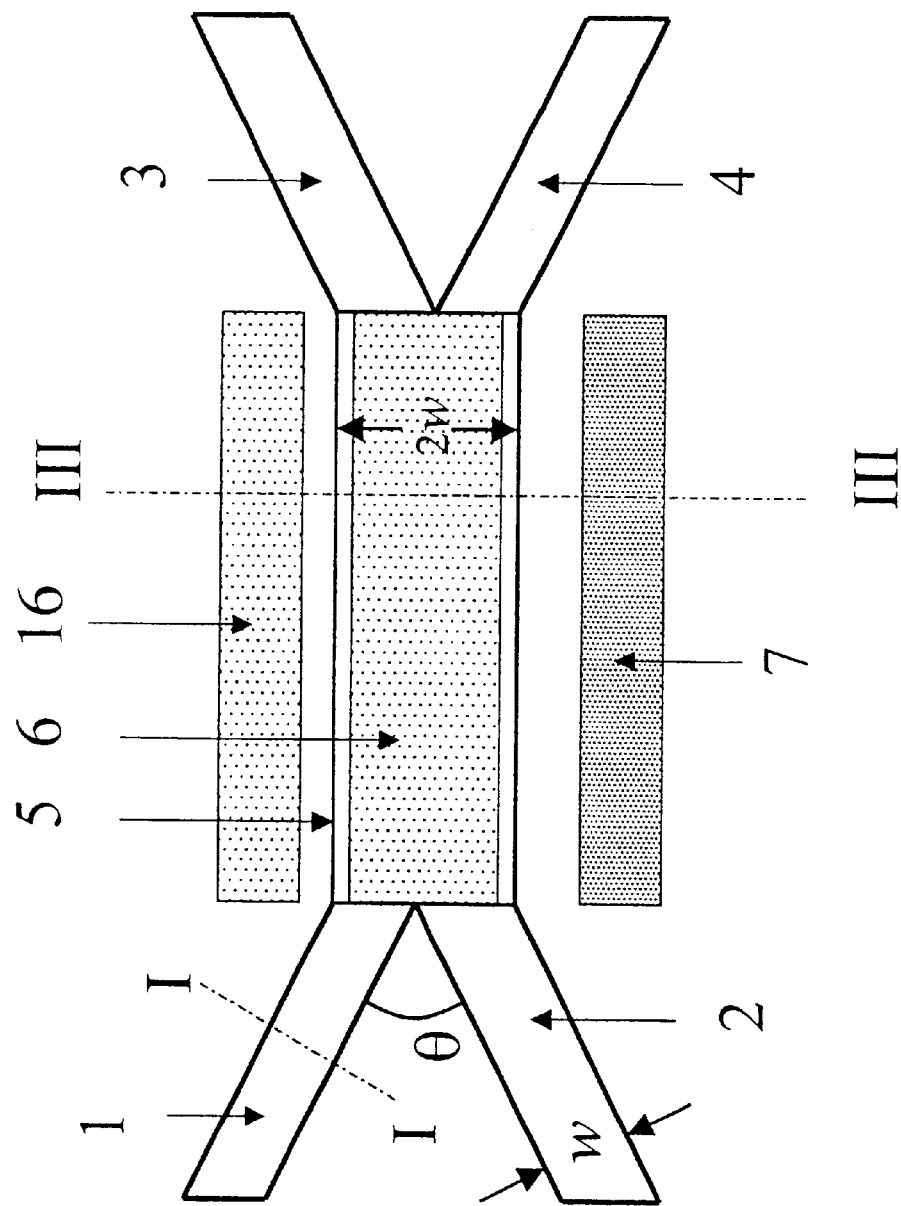
FIG. 4 is a schematic diagram of the high carrier injection optical waveguide switch structure with two abrupt carrier injection regions according to principles of the present invention, based on a TMI coupling structure.

FIG. 4 is a schematic diagram of a high carrier injection optical waveguide switch with a lateral injection and a TMI structure according to the present invention. The general construction of the high carrier injection optical waveguide switch differs from that of the single lateral injection optical waveguide switch of the conventional construction shown in FIG. 1 in that the configuration of a side carrier injection region 16 beside the TMI section 6 is added.

The high carrier injection optical waveguide switch shown in FIG. 4 includes: an input Y-branch with single-mode rib waveguides 1 and 2; a two-mode waveguide section 5; and an output Y-branch with single-mode rib waveguides 3 and 4. Reference numbers 6 and 16 refer to carrier injection regions and 7 is the carrier collection region. The width of the input/output waveguides 1, 2, 3, and 4 is w and the width of the TMI region 5 is 2w.

Figure 5:
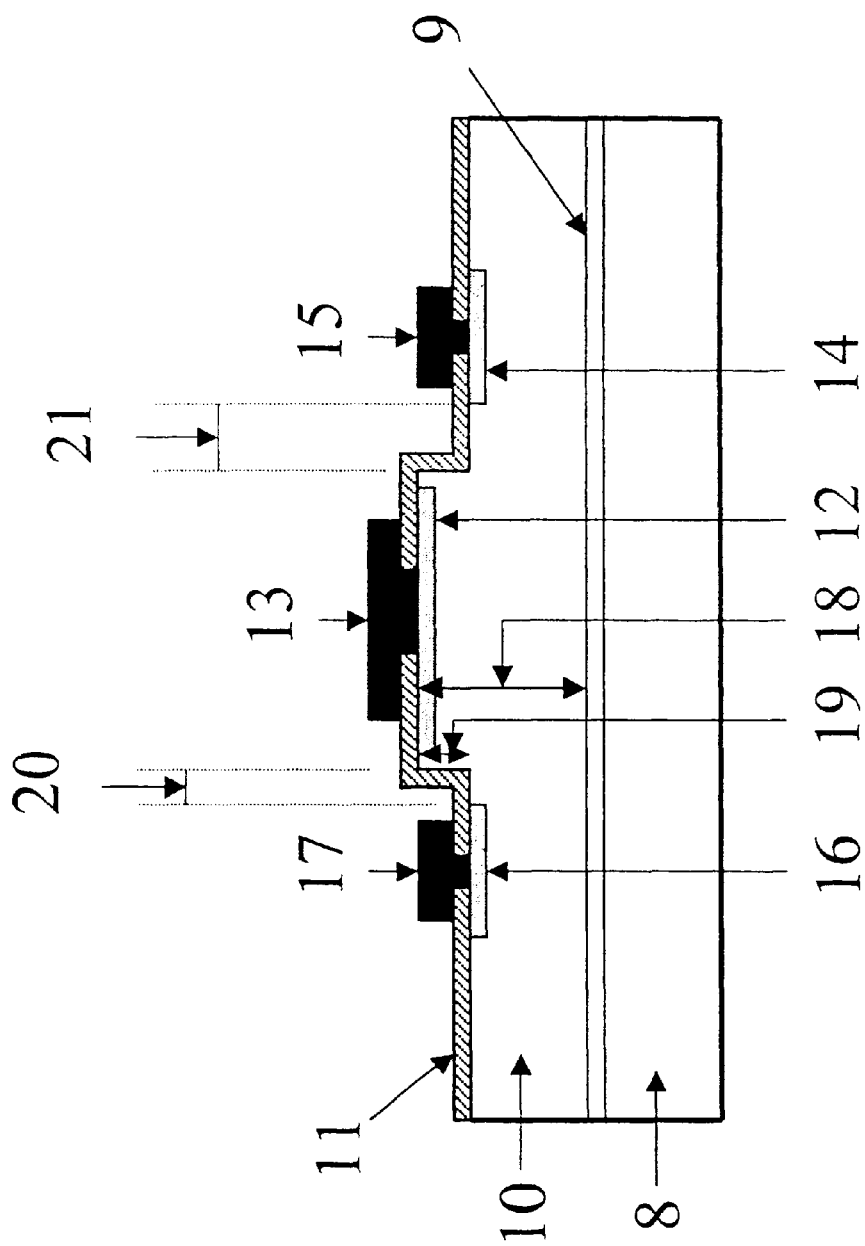
FIG. 5 is a sectional view taken along line III—III of FIG. 4.

FIG. 5 is a sectional view taken along line III—III of FIG. 4. In FIG. 5, reference number 8 is the substrate, 9 is the buffer layer, and 10 is the core waveguide layer. Reference number 11 is the insulator film, and 12, 16 are the two abrupt carrier injection junctions which are, respectively, located on the top of the TMI region and on the left side of the TMI region as shown in FIG. 5. Reference number 14 is the abrupt carrier collection junction which is located on the right side of the TMI region as shown in FIG. 5. Reference number 18 is the thickness of TMI waveguide and 19 is the rib height of the TMI waveguide. Reference number 20 is the distance of the left side carrier injection region 16 and 21 is the distance of the right side carrier collection region 14. Reference numbers 13, 15 and 17 are the contact electrodes.

To manufacture the above-described high carrier injection optical waveguide switch according to an embodiment of the present invention, a Si buffer layer 9 and a SiGe core waveguide layer 10 are successively grown on Si(100) substrate 8. The rib-shaped TMI region is formed by reactive ion etching. Then two abrupt carrier injection junctions 12 and 16 and one abrupt carrier collection junction 14 are made, respectively, by ion implantation using an insulating film 11 of $SiO_2$ as a mask. Next, three contact electrodes 13, 15 and 17 are formed by sputter deposition of Al film, lithography and etching.

During the switch operation, ion implanted regions 12 and 16 inject carriers simultaneously and the abrupt carrier collection junction 14 collects the carriers. As a result, a larger change of refractive index can be achieved due to the larger increase of injected carriers as compared to the single injection optical waveguide switch at the same forward bias voltage.

Figure 6:
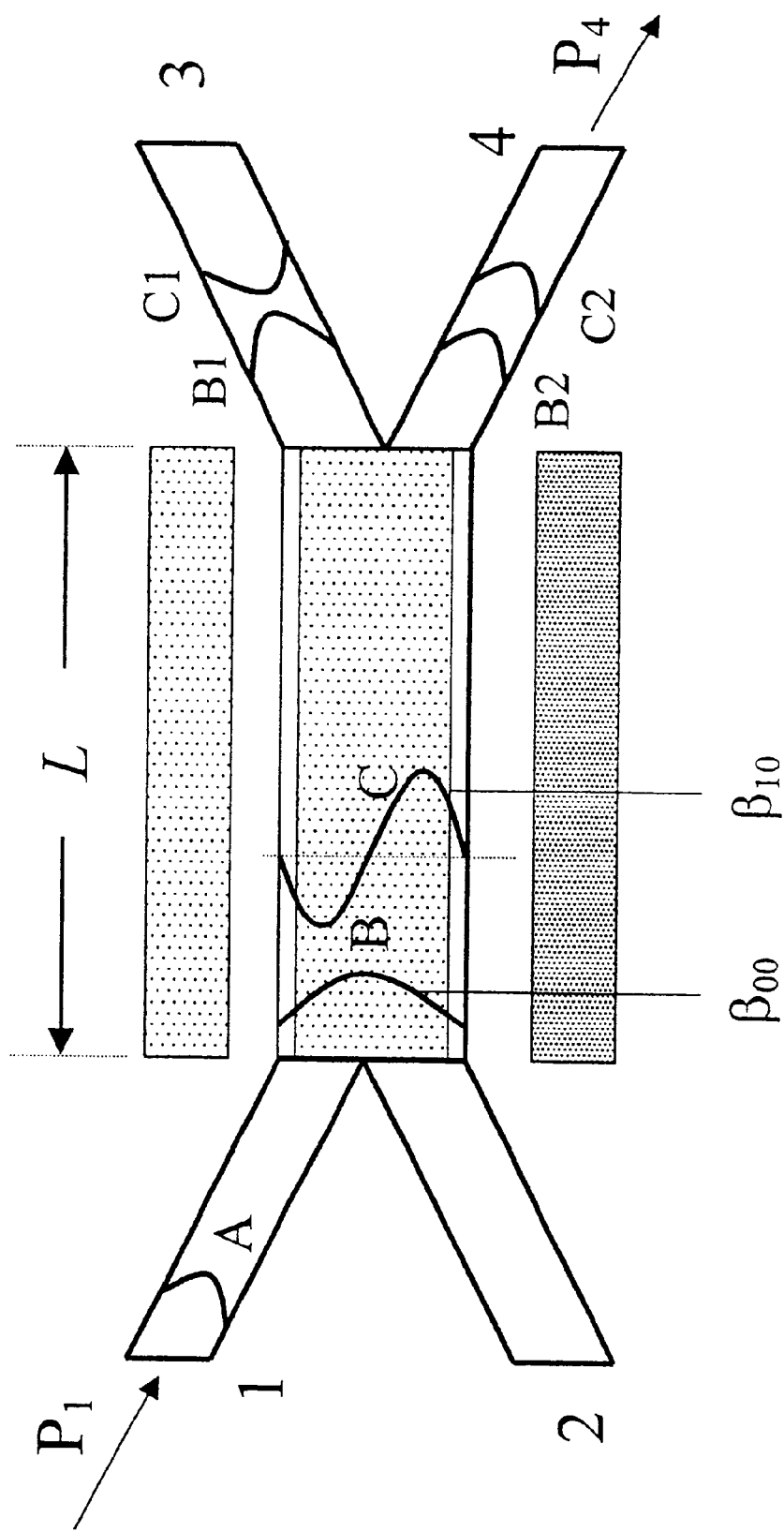
FIG. 6 is a schematic plan view showing the high carrier injection optical waveguide switch output from a waveguide according to FIG. 4 without forward bias.

FIG. 6 is a schematic diagram of the high carrier injection optical waveguide switch under zero bias. If an input light A is coupled into the single-mode rib waveguide 1 as indicated by arrow $P_1$, at the input port of the TMI region, it is excited as a fundamental mode B and a first-order mode C. Mode B and mode C propagate with different propagation phase constants $\beta_{00}$ and $\beta_{10}$, respectively. These two modes interfere along the propagation direction. If no forward bias is applied at both the carrier injection junctions, after the propagation length L, the phase difference $\Delta\phi$ of mode B and mode C satisfies $\Delta\phi=(\beta_{00}-\beta_{10})\cdot L=\pi$, the input light A will output to waveguide 4 as (B2+C2) as indicated by arrow $P_4$ shown in FIG. 6, and there is no output light in the waveguide 3 (B1+C1=0).

Figure 7:
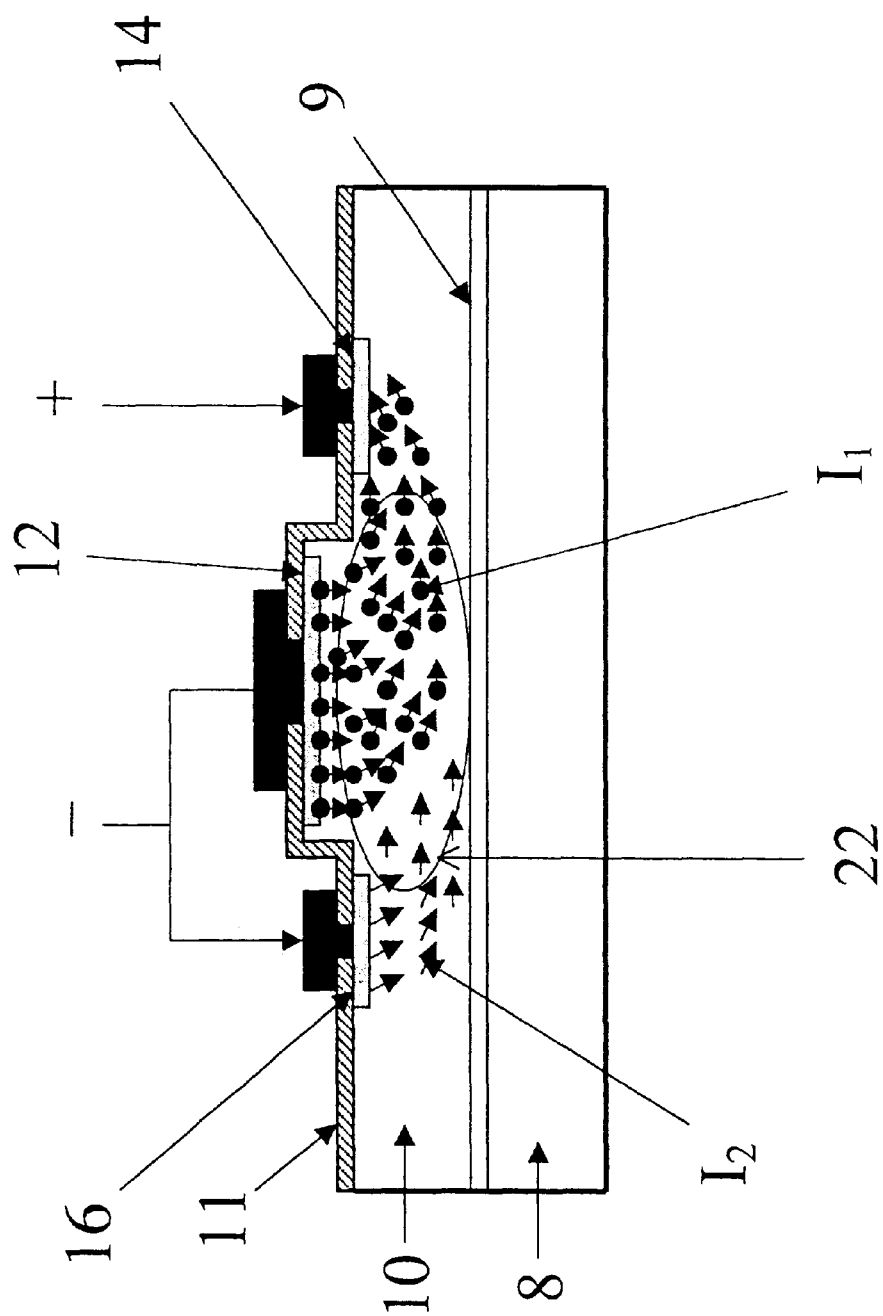
FIG. 7 is a schematic profile of the field mode and carriers injected by the two injection junctions according to FIG. 4 in a cross-section along line III—III.
Figure 8:
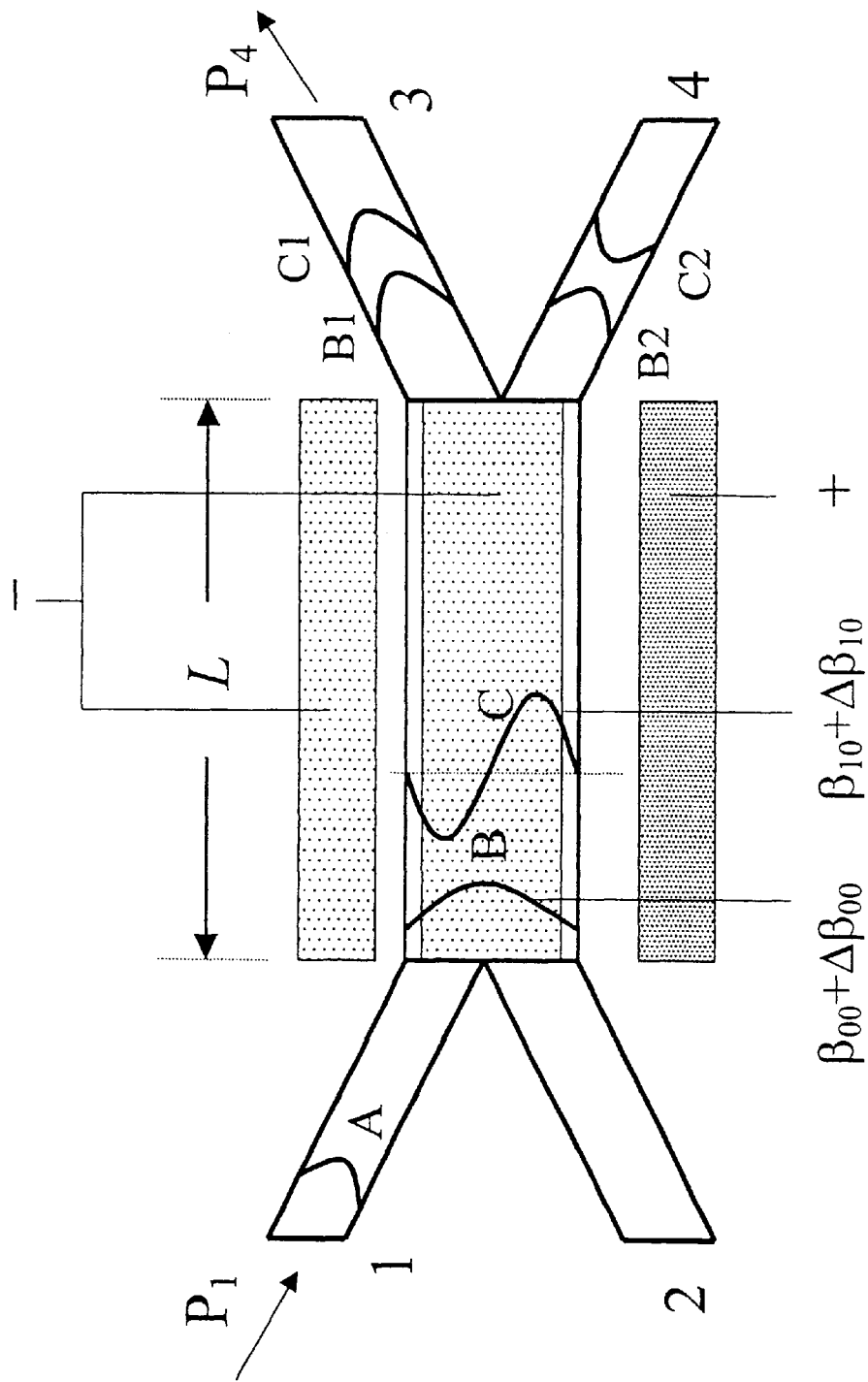
FIG. 8 is a schematic plan view showing the high carrier injection optical waveguide switch output from a waveguide according to FIG. 4 with forward bias.

If both the carrier injection junctions are forward biased simultaneously, as shown in FIG. 7, a large number of carriers ($I_1+I_2$) will be injected into the optically modulated region, i.e., optical field profile region 22, from carrier injection regions 12 and 16, respectively. In this case, the refractive index of region 22 will decrease. Hence, the propagation constant $\beta_{00}$ and $\beta_{10}$ will have a change of $\Delta\beta_{00}$ and $\Delta\beta_{10}$, respectively. If $\beta_{00}$, $\beta_{10}$ and the changes of $\Delta\beta_{00}$, $\Delta\beta_{10}$ satisfy $(\beta_{00}-\beta_{10}+\Delta\beta_{00}+\Delta\beta_{10})\cdot L=0$, the light power will output to the waveguide 3 as (B1+C1) as indicated by arrow $P_3$ shown in FIG. 8, and the waveguide 4 will be cut off (B2+C2=0). Therefore, effective switching is achieved.

As an exemplary implementation of the present invention, a 50 nm p-type Si buffer 9 and a lightly doped p-type SiGe (Ge content at around 4%) layer 10 with a thickness of 2.6 $\mu$m are grown by molecular beam epitaxy (MBE) on a p-Si(100) substrate 8. The boron doped concentrations in the buffer layer 9 and core waveguide layer 10 are about $5\times10^{16}$ $cm^{-3}$. The single mode rib waveguides and TMI rib waveguide are formed by reactive ion etching. A 550 nm thick film 11 of $SiO_2$ is deposited at 400° C. by plasma enhanced chemical vapor (PE-CVD) deposition on the top of the sample surface to serve as the ion implantation mask and as the surface passivation layer. The $n^+$ carrier injection regions 12 and 16 of the switch are realized using phosphorus ion implantation with an energy of 60 keV and a dose of $5\times10^{15}$ $cm^{-2}$. The $p^+$ carrier collection region 14 is formed by boron ion implantation with an energy of 80 keV and the same dose. The $n^+$ and $p^+$ ohmic contacts 13, 15 and 17 are formed by sputter deposition of Al films with thickness of 2.0 $\mu$m and followed by alloying at 440° C. The width w of the rib waveguides 1, 2, 3 and 4 are 8 $\mu$m and the width of the TMI region waveguide is 2w=16 $\mu$m. The rib height 19 is 1.0 $\mu$m and the length of carrier injection region is L=1438 $\mu$m. The branching angle of the Y-junction is $\theta=2.5°$, and the distance 20 and 21 are 10 $\mu$m and 20 $\mu$m, respectively.

The switch is characterized at 1.3 $\mu$m. The light is coupled directly into the input waveguide 1 from the fiber pigtailed of a laser. It is discovered that when both the $pn^+$ junctions 12 and 16 are zero biased only the waveguide 4 has an optical profile as seen in the video monitor. As the forward biases of the both $pn^+$ junctions 12 and 16 increase, the injection currents of both the $pn^+$ junctions increase simultaneously, and the output optical power of the waveguide 4 decreases while the output optical power of the waveguide 3 increases. The device reaches the maximum optical switching state and the output optical power is only in the output waveguide 3 when the total switching current is about 110 mA. In this case the injection current $I_2$ of the $pn^+$ junction 16 which is placed beside the TMI region is 30 mA and the injection current $I_1$ of another pn$^+$ junction 12 which is at the TMI region is 80 mA. The injection current density $J_2$ of the pn$^+$ junction 16 is 260 A/cm$^2$ and the injection current density $J_1$ of pn$^+$ junction 12 is 347.8 A/cm$^2$. To the inventors' knowledge, this is one of the lowest injection current densities reported for carrier injection optical waveguide switches made of SiGe material and/or GaAs material. If $I_2$ is 110 mA and $I_1$ is zero, $J_2$ is 956 A/cm$^2$ and $J_1$ is zero, respectively. If $I_2$ is zero and $I_1$ is 110 mA, $J_2$ is zero and $J_1$ is 478 A/cm$^2$, respectively. In these two cases, the device does not reach the maximum optical switching state.

The losses of the switch were measured at 1.3 μm, the insertion loss is 2.74 dB, other losses are as follows: the absorption loss of the imaging lens is 1.58 dB, an estimated mode mismatch loss is 0.8 dB, and the Fresnel loss at both waveguides ends is 3.2 dB. So the overall loss is 8.32 dB. The crosstalk of the switch, which is defined as $10 \cdot \log(P_4/P_3)$, is less than −15.5 dB at the total switching current of 110 mA.

In the above explained embodiments, Si-based SiGe material has been referred to as an example. However, it can be effectively applied to either Si-based Si, SiGe and SiGeC materials, Si-on-Insulator (SOI), GaAs-based III–V compound materials, InP-based III–V compound materials, LiNbO$_3$ materials, or materials with a bandgap greater than the photon energy of the wave being guided. The materials can be grown by either MBE or CVD. The two carrier injection regions and the carrier collection region can be formed by ion implantation or diffusion. The high carrier injection structure can also be used in all modulators and integrated structures which the refractive index modulation regions controlled by injection carriers. The switch is not only suitable for 1.3 μm wavelength, but is also suitable for 1.55 μm wavelength and all infrared optic-fiber communication wavelengths.

The invention being thus described, various modifications will be readily apparent to those skilled in the art. Such variations are not to be regarded as a departure from the spirit and scope of the invention, and all such modifications are intended to be included within the scope of the following claims.

We claim:

1. A high carrier injection optical waveguide switch, comprising:
    a pair of optical waveguide elements, one functioning as an optical waveguide input and the other functioning as an optical waveguide output;
    a two-mode interference (TMI) region, made of semiconductor material, between said optical waveguide input and said optical waveguide output;
    first and second carrier injection regions; and
    a lateral carrier collection region, said lateral carrier collection region and said first carrier injection region being positioned on opposite sides of said TMI region with said second carrier injection region being positioned between said lateral carrier collection region and said first carrier injection region.

2. The high carrier injection optical waveguide switch according to claim 1, wherein said optical waveguide input and said optical waveguide output each include two single-mode waveguides connected to form a Y-branch.

3. The high carrier injection optical waveguide switch according to claim 2, wherein a Y-branching angle for said optical waveguide input and said optical waveguide output is 2~3°.

4. The high carrier injection optical waveguide switch according to claim 1, wherein said TMI region is a refractive index modulation region.

5. The high carrier injection optical waveguide switch according to claim 4, wherein said refractive index modulation region is a two-mode waveguide region.

6. The high carrier injection optical waveguide switch according to claim 4, wherein said first and second carrier injection regions inject carriers into the said refractive index modulation region.

7. The high carrier injection optical waveguide switch according to claim 6, wherein said lateral carrier collection region collects injection carriers from said first and second carrier injection regions via said refractive index modulation region.

8. The high carrier injection optical waveguide switch according to claim 1, further comprising a first electrode associated with said first carrier injection region and a second electrode associated with said second carrier injection region.

9. The high carrier injection optical waveguide switch according to claim 1, wherein said lateral carrier collection region, said first carrier injection region, and said second carrier injection region extend in parallel along a length dimension of said switch.

10. A high carrier injection optical waveguide switch, comprising:
    a pair of Y-branch optical waveguides, each made of layers of semiconductor material;
    a two-mode interference (TMI) region made of layers of semiconductor material, said TMI region functioning as a refractive index modulation region;
    first and second carrier injection regions; and
    a lateral carrier collection region, said lateral carrier collection region and said first carrier injection region being positioned on opposite sides of said TMI region with said second carrier injection region being positioned between said lateral carrier collection region and said first carrier injection region.

11. The high carrier injection optical waveguide switch according to claim 10, wherein layers of said semiconductor material are formed by molecular beam epitaxy (MBE) or chemical vapor deposition (CVD).

12. The high carrier injection optical waveguide switch according to claim 10, wherein said TMI region is formed on a semiconductor substrate of Si, or GaAs, or InP.

13. The high carrier injection optical waveguide switch according to claim 10, wherein said TMI region includes a core waveguide layer made of SiGe, Si, SiGeC, LiNbO$_3$ or a III–V compound semiconductor.

14. The high carrier injection optical waveguide switch according to claim 13, wherein said core waveguide layer is covered by SiO$_2$ film.

15. The high carrier injection optical waveguide switch according to claim 14, wherein said cover film SiO$_2$ is formed by PE-CVD or LP-CVD.

16. The high carrier injection optical waveguide switch according to claim 10, wherein a buffer layer is positioned between said core waveguide layer and a semiconductor substrate.

17. The high carrier injection optical waveguide switch according to claim 10, wherein said refractive index modulation region is activated by current injection from electrodes on said carrier injection regions.

18. The high carrier injection optical waveguide switch according to claim 17, wherein an electrode is provided on said carrier collection region, and the electrodes on said carrier injection regions and said carrier collection region are metal.

19. The high carrier injection optical waveguide switch according to claim 18, wherein said electrodes are formed by sputter deposition, lithography, and etching.

20. A high carrier injection optical waveguide switch according to claim 10, wherein said refractive index modulation region is activated by applying voltage to electrodes on said first and second carrier injection regions.

21. The high carrier injection optical waveguide switch according to claim 10, wherein a refractive index change in said TMI region is generated by injecting current from electrodes on said first and second carrier injection regions; and said first and second carrier injection regions and said carrier collection region are heavily doped as compared to portions of said TMI region.

22. The high carrier injection optical waveguide switch according to claim 21, wherein said carrier collection region is formed by ion implantation using dopants that reach a depth of a core layer.

23. The high carrier injection optical waveguide switch according to claim 22, wherein said dopants of said carrier collection region are p-type dopants.

24. The high carrier injection optical waveguide switch according to claim 21, wherein said carrier injection region is formed by ion implantation using dopants that reach a depth of a core layer.

25. The high carrier injection optical waveguide switch according to claim 24, wherein said dopants are n-type dopants.

26. The high carrier injection optical waveguide switch according to claim 10, further comprising a first electrode associated with said first carrier injection region and a second electrode associated with said second carrier injection region.

27. The high carrier injection optical waveguide switch according to claim 10, wherein said lateral carrier collection region, said first carrier injection region, and said second carrier injection region extend in parallel along a length dimension of said switch.

28. A high carrier injection optical waveguide switch, comprising:

a pair of Y-branch optical waveguides, one of said Y-branch optical waveguides being an input and the other being an output and each including a pair of Y-connected single-mode rib optical waveguides;

a two-mode interference (TMI) region which functions as a refractive index modulation region, said TMI region being a two-mode rib optical waveguide; and two carrier injection regions for injecting current into said TMI region to effect switching.

29. The high carrier injection optical waveguide switch according to claim 28, wherein said optical waveguide switch is constructed using molecular beam epitaxy (MBE) or chemical vapor deposition (CVD).

30. The high carrier injection optical waveguide switch according to claim 28, wherein said single-mode rib waveguides and said two-mode rib waveguide are constructed using reactive ion etching or wet chemical etching.

31. The high carrier injection optical waveguide switch according to claim 28, further comprising a first electrode associated with a first carrier injection region and a second electrode associated with a second carrier injection region.

32. The high carrier injection optical waveguide switch according to claim 28, wherein said lateral carrier collection region, and said two carrier injection regions extend in parallel along a length dimension of said switch.

* * * * *